J. WATSON.
LAWN MOWER.
APPLICATION FILED FEB. 4, 1908.

901,402.

Patented Oct. 20, 1908.

Witness:
Frank B. Hoffmans
R. M. Smith.

Inventor
Joseph Watson
By Victor J. Evans
Attorney

UNITED STATES PATENT OFFICE.

JOSEPH WATSON, OF OBION, TENNESSEE.

LAWN-MOWER.

No. 901,402.

Specification of Letters Patent.

Patented Oct. 20, 1908.

Application filed February 4, 1908. Serial No. 414,227.

*To all whom it may concern:*

Be it known that I, JOSEPH WATSON, a citizen of the United States, residing at Obion, in the county of Obion and State of Tennessee, have invented new and useful Improvements in Lawn-Mowers, of which the following is a specification.

This invention relates to lawn mowers, the object of the invention being to simplify and improve the construction of lawn mowers in general so as to materially cheapen the cost of manufacture and at the same time provide a simple and reliable cutting mechanism involving the use of a reliable reciprocating cutter or sickle bar.

With the above and other objects in view, the nature of which will more fully appear as the description proceeds, the invention consists in the novel construction, combination and arrangement of parts as hereinafter fully described, illustrated and claimed.

Figure 1:
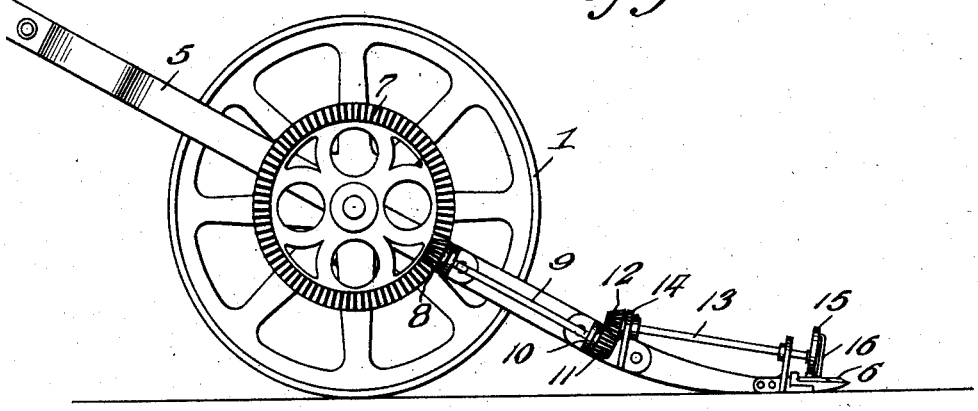
Figure 2:
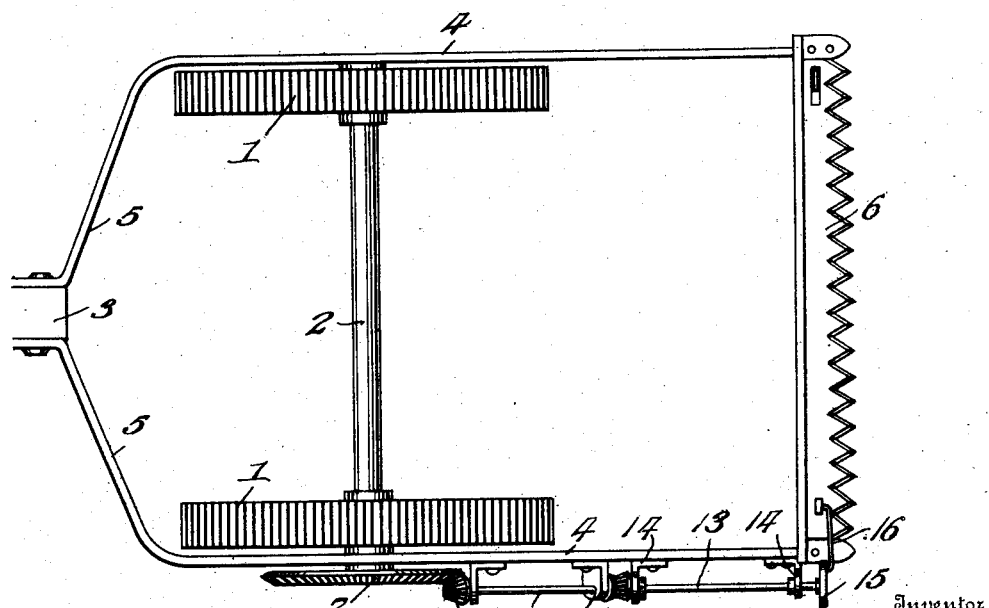

In the accompanying drawings:—Figure 1 is a side elevation of a lawn mower embodying the present invention. Fig. 2 is a plan view of the same.

The lawn mower contemplated in this invention comprises essentially a pair of carrying wheels 1 mounted upon a common axle 2. The frame of the machine comprises a handle 3 of any suitable length and a fork comprising oppositely arranged arms or side bars 4 the inner ends of which are bent inward as shown at 5 and rigidly secured to the handle 3. The arms 4 are spaced apart to include or embrace the carrying wheels 1 and are mounted on the shaft or axle 2. The arms 4 are also extended a suitable distance in advance of the axle and carrier wheels and have a reciprocating cutter or sickle bar 6 mounted thereon so as to travel rapidly back and forth at right angles in the direction of movement of the lawn mower.

Secured to the hub of the adjacent carrying and traction wheel 1 is a driving bevel wheel 7 which meshes with and drives a pinion 8 fast on a transmission shaft 9 which is journaled in bearings 10 on the adjacent arm 4 of the fork, the said shaft extending lengthwise of said fork arm as clearly shown in Figs. 1 and 2. On its forward end the transmission shaft 9 is provided with another pinion 11 which meshes with and drives a pinion 12 on the inner end of a pitman shaft 13 which is also journaled in suitable bearings 14 on the same side arm of the fork, said shaft also extending lengthwise of said arm. On the forward extremity of the pitman shaft 13 is mounted a pitman wheel 15 through which a pitman 16 extends to and connects pivotally with the cutter or sickle bar 6.

The mechanism above described may be made exceedingly light and the fork or frame of the machine may also be made proportionately light. In this way a very light portable and effective lawn mower is produced which is susceptible of economical manufacture.

Having thus described the invention, what is claimed as new, is:—

A lawn mower comprising an axle and carrying wheels thereon, a handle, a fork secured to the handle and mounted on said axle and made of a width to include the carrying wheels and of a length to project in front of said wheels, a reciprocating cutter supported by the fork arms in advance of the carrying wheels, a driving bevel gear mounted to turn with the adjacent carrying wheel, a transmission shaft journaled on one of the fork arms and geared to said bevel gear, a pitman shaft also journaled on said fork arm and geared to the transmission shaft, and a pitman connecting the pitman shaft with the cutter.

In testimony whereof I affix my signature in presence of two witnesses.

JOSEPH WATSON.

Witnesses:
A. WILSON,
H. C. CORLEY.